United States Patent [19]

Harris et al.

[11] 3,755,146

[45] Aug. 28, 1973

[54] ISOMERIZATION AND HYDROCRACKING OF PARAFFINS

[75] Inventors: Jesse R. Harris; Clifford E. Smith, both of Bartlesville, Okla.

[73] Assignee: Phillips Petroleum Company, Bartlesville, Okla.

[22] Filed: Sept. 17, 1971

[21] Appl. No.: 181,594

[52] U.S. Cl.............. 208/112, 208/108, 208/110, 208/134, 208/136, 252/467, 252/470, 260/683.65
[51] Int. Cl............................................. C10g 13/02
[58] Field of Search................... 208/112, 108, 110, 208/136, 134; 260/683.65; 252/467, 470

[56] References Cited
UNITED STATES PATENTS
3,639,647   2/1972   Kehl et al. ......................... 252/439

OTHER PUBLICATIONS
Vannice et al., "Mobility of Hydrogen in Hydrogen Tungsten Bronze" Journal of Catalysis 17 359–365 (1970).

Sienko et al., "Infrared and ESR Study of Hydrogen Tungsten Bronze" J. Am. Chem. Soc. 90 6568–6570 (11–6–68).

*Primary Examiner*—Delbert E. Gantz
*Assistant Examiner*—G. E. Schmitkons
*Attorney*—Young & Quigg

[57] ABSTRACT

A process for isomerization and hydrocracking of paraffins is provided using as catalyst a hydrogen metal bronze. In one embodiment of the invention a supported catalyst comprising a hydrogen metal bronze is used to promote the isomerization and hydrocracking of paraffins.

8 Claims, No Drawings

3,755,146

ISOMERIZATION AND HYDROCRACKING OF PARAFFINS

BACKGROUND OF THE INVENTION

This invention relates to isomerization and hydrocracking of paraffins. In one of its aspects this invention relates to isomerization and hydrocracking reactions catalyzed by a hydrogen metal bronze. In another of its aspects this invention relates to a supported catalyst system for isomerization and hydrocracking reactions. In one of its concepts the invention relates to the catalysis of hydrocracking and isomerization reactions using hydrogen metal bronze catalyst produced by the room temperature reduction of metal trioxides.

Hydrogen metal bronzes and methods for preparing these compounds have been of considerable interest in the art as an example of the phenomenon of dissociative adsorption of hydrogen on a supported metal under conditions where direct adsorption of hydrogen on the support is negligible. This phenomenon is called spillover and is reported by Vannice, Boudart, and Fripiat in the Journal of Catalysis 17, 359–365 (1970). In this article a method for producing hydrogen metal bronze through a room temperature reduction is reported.

We have found that hydrogen metal bronzes can be used as catalyst for the isomerization and hydrocracking of paraffins. It is therefore an object of this invention to provide a method for isomerizing and hydrocracking both straight chain paraffins and cycloparaffins. It is another object of this invention to provide a catalyst for the isomerization and hydrocracking of straight chain paraffins and cycloparaffins. It is still another object of this invention to provide a supported catalyst for the isomerization and hydrocracking of straight chain paraffins and cycloparaffins.

SUMMARY OF THE INVENTION

In accordance with our invention, a method of isomerizing and hydrocracking paraffins is provided which comprises passing the paraffin over a hydrogen metal bronze at a temperature within the range of about 250 to about 450°C. At reaction temperatures between 250° and 350°C the isomerization reaction is favored. From 350° to 450°C a cracking reaction is favored.

DESCRIPTION OF THE PREFERRED EMBODIMENTS

The catalyst suitable for this reaction is prepared from platinum, palladium or their oxides physically mixed with or impregnated onto a metal oxide of Group VI-B of the Periodic Table of the Elements such as tungsten trioxide or molybdenum trioxide. These oxides can be supported on high surface area alumina, silica, titania, zirconia, or boria taken alone or in combination or other high surface area supports.

The catalyst mixtures are comprised of the metal trioxide to which is admixed from 0.002 to 5 weight percent of the total weight of the catalyst of platinum, palladium or their oxides, preferably from 0.05 to 2 weight percent of the total weight of the catalyst. With a supported catalyst from 1 to about 50 weight percent of the total weight of the catalyst comprising the metal oxide, from 0.002 to 5 weright percent comprising platinum, palladium or their oxides, and the balance of the catalyst comprising the support. A preferred range of concentration for the supported catalyst comprises about 5 to 25 weight percent of the metal oxide, about 0.05 to 2 weight percent of platinum, palladium or their oxides, and the balance of the material being the support.

The conditions of preparation of the catalyst are very important in that at higher temperatures a reduced form of the metal oxide is produced instead of the hydrogen metal bronze produced when activation is carried out at temperatures of less than 100°C. In the preparation of the catalyst, where impregnated catalysts are used, before hydrogen activation the catalyst mixtures are heated in dry air at 300° to 400°C for 5 to 10 hours to remove volatiles. Catalysts made by physical mixing of the components can be activated directly without pretreatment. Hydrogen activation is carried out by exposure of the mixture to water vapor and then exposure to a hydrogen containing gas or by exposure to a web hydrogen containing gas at an activation temperature of less than 100°C. The activation temperature should preferably be in the range of about 25° to 40°C. The hydrogen containing gas can be hydrogen, hydrogen sulfide or hydrogen chloride, but hydrogen is preferred. Water vapor pressure or the partial pressure of the water vapor and hydrogen containing gas can be from 0.01 to 50 millimeters of mercury. Water vapor pressure of 5 to 25 millimeters of mercury preferred.

The length of the activation treatment depends on the concentration of the platinum, palladium, or the oxides thereof in the catalyst mixture and also on the total amount of the catalyst mixture. Catalyst treatments ranging in length from one-half hour to 24 hours have been successfully used; however, one hour is ususally a sufficient treatment time.

After activation the catalyst is heated to reaction temperature under a dry hydrogen blanket or a blanket of an inert gas such as nitrogen, argon or the like. The reaction temperature will be in the range of about 250° to about 450°C. A temperature range of 250°C to 350°C favors isomerization; while temperatures from 350°C to 450°C favor cracking. The reaction pressure can vary from one to 1,000 psia with higher pressures favoring cracking.

The catalysts of this invention can be used to isomerize and hydrocrack paraffins. The catalyst is particularly useful in hydrocracking and isomerizing straight chain paraffins having from four to 20 carbon atoms. Cycloparaffins can also be successfully isomerized and hydrocracked using these catalysts.

The hydrogen to hydrocarbon ratios useful in this invention range from 5:1 to 16:1 with the higher hydrogen ratios up to 16:1 being referred for the hydrocracking conditions. Throughput rate for the reaction is in the range of WHSV of 0.01 to 3 grams of hydrocarbon per gram of catalyst per hour with a WHSV of 0.05 to 1 preferred.

EXAMPLE I

Tungstic acid ($H_2WO_3$, Fisher reagent grade) was boiled in distilled water for 4 hours and rapidly filtered to remove soluble $H_2WO_4 \cdot nH_2O$. The filter cake was dried overnight at 110°C. The filter cake was impregnated with aqueous chloroplatinic acid (Fisher reagent grade) solution to give 0.2 weight percent Pt. The catalyt was dried overnight at 110°C and heated in air at 400°C for 4 hours to give 0.2 percent $Pt/WO_3$.

Two activations were used for purpose of comparison.

A. The catalyst was heated to 500°C in dry air, held at that temperature for five hours, and cooled to room temperature. The reactor was evacuated and the catalyst exposed to water vapor for 30 minutes. The catalyst was then flushed with argon and a mixture of hydrogen and argon ($H_2/Ar=0.19$) was passed over the catalyst for 1 hour. The color went from yellow to blue immediately indicating the formation of the hydrogen analog of tungsten bronze, ($H_xWO_3$ $0<X<1$). The catalyst was then heated to 300°C under argon for activity test.

B. The same catalyst sample used in (A) was heated in dry air at 500°C for five hours. Hydogen was then passed over the catalyst held at 500°C for 1 hour. The catalyst was cooled to 300°C under flowing hydrogen for activity test. This activation gives a reduced form of tungsten oxide, $WO_{3-x}$.

EXAMPLE II n-Hexane was isomerized and hydrocracked at a temperature from 300 to 350°C at a WHSV of 0.081 gram of n-hexane/grams catalyst/hour after passing NCG hydrogen at a rate of 10 cc per minute through a dryer and then thorugh a saturator filled with n-hexane held at 0.8°C and then to the reactor. The isomerization and hydrocracking results are tabulated below.

TABLE I

| | Temperature, °C. | | | | | | | |
|---|---|---|---|---|---|---|---|---|
| | 300 | | 300 | | 300 | | 350 | |
| | Time, min. | | | | | | | |
| | 30 | | 60 | | 170 | 120 | 60 | |
| | A | B | A | B | A | B | A | B |
| Product: | | | | | | | | |
| $C_1$ | 1.9 | 5.1 | 0.4 | 1.8 | | 0.9 | | 0.8 |
| $C_2$ | 0.7 | 0.9 | 0.7 | 0.5 | 0.9 | 0.5 | 0.9 | 1.2 |
| $C_3$ | 19.0 | 5.9 | 14.4 | 4.4 | 11.4 | 3.0 | 15.5 | 4.5 |
| i-$C_4$ | 0.7 | 2.3 | 1.3 | 1.6 | 1.1 | 0.7 | 0.8 | 0.6 |
| n-$C_4$ | 0.8 | 0.4 | 0.9 | 0.3 | 0.7 | 0.3 | 1.0 | 0.2 |
| i-$C_5$ | 1.0 | 1.6 | 0.9 | 1.0 | 0.8 | 0.9 | 0.6 | 0.4 |
| n-$C_5$ | 0.6 | 0.4 | 0.7 | 0.3 | 0.4 | 0.3 | 0.5 | |
| 2-2 dimethyl-$C_4$ | 1.7 | 0.2 | 1.1 | 0.2 | 0.8 | | 0.3 | |
| 2-3 dimethyl-$C_4$ | 2.9 | 0.9 | 2.8 | 0.8 | 1.7 | 0.5 | 0.5 | 0.4 |
| 2-methyl-$C_5$ | 16.3 | 3.2 | 13.3 | 2.4 | 11.0 | 1.5 | 2.8 | 1.5 |
| 3-methyl-$C_5$ | 10.5 | 2.4 | 8.5 | 2.1 | 7.4 | 1.7 | 2.1 | 0.9 |
| n-$C_6$ | 43.8 | 76.6 | 55.0 | 84.6 | 63.9 | 89.5 | 75.4 | 89.3 |
| Percent: | | | | | | | | |
| Conversion | 56.2 | 23.4 | 45.0 | 15.4 | 36.1 | 10.5 | 24.6 | 10.7 |
| Cracked | 24.7 | 16.6 | 19.3 | 9.9 | 15.3 | 6.6 | 19.3 | 7.7 |
| Isomerization | 31.5 | 6.8 | 25.7 | 5.5 | 20.8 | 3.9 | 5.3 | 3.0 |
| Selectivity to cracking | .44 | .71 | .43 | .64 | .42 | .63 | .79 | .72 |
| Selectivity to $C_3$ | .77 | .36 | .75 | .44 | .74 | .46 | .80 | .59 |

The data above show the effectiveness of the hydrogen tungsten bronze as a catalyst as compared to the reduced form of tungsten oxide.

EXAMPLE III $\gamma$-$Al_2O_3$ (Harshaw A1-0104, 30-100 mesh) was impregnated with an aqueous ammonium metal-tungstate solution and evaporated to dryness and further dried at 110°C for 48 hours. This material was impregnated with an aqueous chloroplatinic acid solution, evaporated to dryness and further dried at 110°C for 16 hours. The dry catalyst was heated to 375°C for 4 hours in dry air to drive off volatiles and give 2 weight percent Pt, 25 weight percent $WO_3$, the remainder is $\gamma$-$Al_2O_3$.

Three activations were used for purposes of comparison.

A. To produce the hydrogen tungsten bronze. The catalyst was first heated in dry air at 500°C for 5 hours, then cooled to room temperature. The catalyst was exposed to water vapor for 30 minutes and then to dry hydrogen at room temperature (10 cc/min.) for 1 hour. Color went from yellow-gray to blue indicating bronze formation. Catalyst was then heated to test temperature (300°C) under argon.

B. High temperature reduction — The catalyst was heated first in dry air at 500°C for 5 hours, then in hydrogen at 500°C for 1 hour and cooled to test temperature (300°C) under hydrogen.

C. No activation — The catalyst was heated in dry air at 500°C for 2 hours, cooled under air to test temperature (300°C) and exposed to feed.

EXAMPLE IV

N-hexane was isomerized and hydrocracked at a temperature of 300°-350°C using 2 grams of the catalyst produced and activated as in Example III. The catalyzed reaction was carried out at 1 atmosphere pressure, a hydrogen flash/n-hexane ratio of about 14 to 1 and a WHSV of 0.081 gram n-hexane/gram catalyst/hour. NCG hydrogen was passed through a dryer at a rate of 10 cc's per minute, then through a saturator held at 0.8°C filled with n-hexane and then to the reactor. The results of this catalyzed reaction are tabulated below.

TABLE II

| | Temperature (° C.) | | | | | | | |
|---|---|---|---|---|---|---|---|---|
| | 300 | 300 | 300 | 300 | 350 | 350 | 350 | 350 |
| | Time (min.) | | | | | | | |
| | 60 | 60 | 60 | 60 | 60 | 60 | 60 | 60 |
| Activation | A | B | C | A | A | B | C | A |
| Product, mole percent: | | | | | | | | |
| $C_1$ | | | | | | | | |
| $C_2$ | 0.9 | | | 0.2 | 0.4 | 0.7 | 0.6 | 0.9 |
| $C_3$ | 1.5 | 0.4 | 0.7 | 0.4 | 7.0 | 2.6 | 10.5 | 7.0 |
| i-$C_4$ | 0.2 | | 0.1 | t | 0.4 | 0.1 | 0.3 | 0.4 |
| n-$C_4$ | 0.6 | | 0.1 | t | 0.4 | 0.1 | 0.5 | 0.4 |
| i-$C_5$ | 0.5 | | t | t | 0.3 | 0.2 | 0.3 | 0.4 |
| n-$C_5$ | 0.5 | | t | t | 0.3 | 0.1 | 0.3 | 0.4 |
| 2-2 dimethyl-$C_4$ | 6.5 | t | 0.9 | 1.8 | 2.7 | t | 0.5 | 0.9 |
| 2-3 dimethyl-$C_4$ | 4.2 | t | 2.4 | 3.2 | 5.8 | 0.3 | 0.8 | 0.8 |
| 2-methyl-$C_5$ | 29.1 | 0.4 | 15.2 | 20.9 | 26.5 | 1.0 | 5.8 | 10.6 |
| 3-methyl-$C_5$ | 20.0 | 0.7 | 10.6 | 14.6 | 20.4 | 1.4 | 4.2 | 7.7 |
| n-$C_6$ | 36.1 | 98.5 | 69.8 | 58.7 | 35.8 | 93.5 | 76.4 | 70.5 |
| Percent: | | | | | | | | |
| Conversion | 63.9 | 1.5 | 30.2 | 41.3 | 64.2 | 6.5 | 23.6 | 29.5 |
| Cracked | 4.2 | 0.4 | 0.9 | 0.6 | 8.8 | 3.8 | 12.5 | 9.5 |
| Isomerization | 59.7 | 1.1 | 29.3 | 40.7 | 55.4 | 2.7 | 11.1 | 20.5 |

The table above shows the effectiveness of the supported tungsten bronze catalyst as compared to catalyst prepared with a high temperature reduction or with no activation.

EXAMPLE V

Three cc of mixture of 1.0 percent $PtO_2$ and reagent grade $MoO_3$ (surface area 0.8 $m^2/gr$) was placed in the reactor which has an 8 mm diameter-fixed bed. The mixture was treated for 3 hours with moist hydrogen-($H_2$ passed through water trap immersed in ice)-wherein the vapor pressure of $H_2O$ was 5 mm. Color of catalyst became deep purple. Hydrogen and n-hexane vapor were then passed over the catalyst at gaseous space rate of 580 cc/cc hr (STP) and a 0.68 weight hour space velocity of n-hexane. The temperature on the catalyst was increased stepwise and the following data obtained at various temperatures.

TABLE III

| temperature | % conversion | % selectivity to isomerization | % selectivity to cracking |
|---|---|---|---|
| 600°F (~315°C) | 25 | 85 | 15 |
| 700°F (~370°C) | 70 | 74 | 26 |
| 800°F (~425°C) | 97.5 | 3.6 | 96.4 |

The table above illustrates the effectiveness of molybdenum hydrogen bronze as a catalyst for hydrocracking and isomerization of n-hexane.

EXAMPLE VI

Three cc of a mixture of 0.1 percent $PtO_2$ and reagent grade $MoO_3$ were placed in a reactor which had 8 mm diameter. The mixture was treated with moist hydrogen ($H_2$ passed through water trap immersed in ice so vapor pressure of $H_2O$ was about 5 mm) — the color of catalyst became deep purple. $H_2$ plus n-heptane were passed over the catalyst at a gaseous space velocity of 1,300 and a 0.118 liquid hourly space velocity of n-heptane. The temperature was increased stepwise and the following results obtained.

TABLE IV

| temperature | % conversion | % selectivity to isomerization | % selectivity to cracking |
|---|---|---|---|
| 600°F (~315°C) | 14 | 69 | 31 |
| 700°F (~370°C) | 77.6 | 1.7 | 98.3 |

The table above illustrates the effectiveness of molybdenum hydrogen bronze as a catalyst for hydrocracking and isomerization of n-heptane.

EXAMPLE VII

Shut down the reaction of Example VI and left with stream of moist hydrogen for 15 hours before resuming the reaction. On resumption of the reaction conditions the following results were obtained.

TABLE V

| temperature | % conversion | % selevtivity to isomerization | % selectivity to cracking |
|---|---|---|---|
| 700°F (~370°C) | 92.4 | .5 | 99.5 |
| 800°F (~425°C) | 97.3 | - | ~100 |

This table illustrates regeneration of the catalyst and higher selectivity of the catalyst for cracking reaction at elevated temperatures.

Reasonable variation and modification are possible within the scope of this disclosure and the appended claims the essence of which is that a hydrogen metal bronze made with a metal from Group VI-B of the periodic table can be used as a catalyst which by manipulation of reaction conditions is useful for the isomerization of paraffins to products of increased octane number or for hydrocracking of paraffins. For example at temperatures below 350°C n-hexane can be isomerized to dimethyl butane and methyl pentane and above 350°C can be hydrocracked selectively to ethane.

we claim:

1. A method for isomerizing and hydrocracking straight chain paraffins and cycloparaffins comprising contacting the paraffins at a temperature within the range of about 250°C to about 450°C in the presence of hydrogen with a hydrogen metal bronze wherein the metal is a metal from Group VI-B of the Periodic Table of Elements.

2. The method of claim 1 wherein a mixture of a trioxide of a Group VI-B metal and an amount of platinum, palladium, or thier oxides in the range of about 0.5 to about 2 weight percent of the total mixture is exposed to water vapor and hydrogen at an activation temperature of less than 100°C for a time sufficient to produce the catalyst comprising a hydrogen metal bronze.

3. The method of claim 1 wherein the metal is tungsten.

4. The method of claim 1 wherein the metal is molybdenum.

5. The method of claim 1 wherein the reaction temperature is in the range of 250° to 350°C whereby isomerization reaction is favored.

6. The method of claim 1 wherein the reaction temperature is in the range of 350° to 450°C whereby a cracking reaction is favored.

7. The method of claim 1 wherein the reaction pressure is in the range of 1 to 1,000 psia, the hydrogen to hydrocarbon ratio is in the range of 5:1 to 16:1 and the WHSV is in the range of 0.1:3.

8. The method of claim 1 wherein the hydrogen metal bronze is supported on a high surface area support chosen from among the group comprising high surface area alumina, silica, titania, zirconia, boria, and combinations thereof.

* * * * *